United States Patent
Yoon et al.

(10) Patent No.: US 10,266,437 B2
(45) Date of Patent: Apr. 23, 2019

(54) METHOD OF CLEANING A DRINKING WATER SUPPLY DEVICE

(71) Applicant: LG ELECTRONICS INC., Seoul (KR)

(72) Inventors: Heesang Yoon, Seoul (KR); Myounghoon Lee, Seoul (KR); Sangki Woo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 435 days.

(21) Appl. No.: 14/959,157

(22) Filed: Dec. 4, 2015

(65) Prior Publication Data

US 2016/0167989 A1 Jun. 16, 2016

(30) Foreign Application Priority Data

Dec. 11, 2014 (KR) .................... 10-2014-0178358

(51) Int. Cl.
*B01F 3/08* (2006.01)
*B01F 5/04* (2006.01)
(Continued)

(52) U.S. Cl.
CPC ............ *C02F 1/686* (2013.01); *B01F 3/0865* (2013.01); *B01F 5/0471* (2013.01); *C02F 1/008* (2013.01);
(Continued)

(58) Field of Classification Search
CPC .......... C02F 1/686; C02F 1/008; C02F 1/444; C02F 2303/22; C02F 2307/10;
(Continued)

(56) References Cited

U.S. PATENT DOCUMENTS 3,785,492 A * 1/1974 Mazza ................ B67D 1/0406
  210/149
5,203,989 A 4/1993 Reidy
(Continued)

FOREIGN PATENT DOCUMENTS

CN 1316571 10/2001
CN 1604984 4/2005
(Continued)

OTHER PUBLICATIONS

KR 20130080111 Kipris Machine Translation obtained Apr. 18, 2018.*
(Continued)

*Primary Examiner* — Walter D. Griffin
*Assistant Examiner* — Shuyi S. Liu
(74) *Attorney, Agent, or Firm* — Ked & Associates, LLP (57) ABSTRACT

A drinking water supply device may comprise a mineral water supply module comprising a mineral cartridge to store condensed minerals, a mineral supply pipe provided with a micro channel to supply minerals to a water supply pipe, a mineral cartridge receiver detachably coupled to the mineral cartridge and connected to the mineral supply pipe, a mineral supply valve to open and close the mineral supply pipe, and a discharge pipe to discharge filtered water or mineral water. A method of cleaning a drinking water supply device may comprise of discharging residual minerals using a mineral drainage unit including a drainage pipe connected to the mineral supply pipe and a drainage valve to open and close the drainage pipe, supplying cleaning water to a channel in which minerals or mineral water flow of the mineral water supply module, and supplying rinsing water to the channel.

9 Claims, 6 Drawing Sheets

(51) Int. Cl.
   *C02F 1/00* (2006.01)
   *C02F 1/28* (2006.01)
   *C02F 1/44* (2006.01)
   *C02F 1/68* (2006.01)

(52) U.S. Cl.
   CPC ....... *B01F 2003/0896* (2013.01); *C02F 1/283* (2013.01); *C02F 1/444* (2013.01); *C02F 2201/006* (2013.01); *C02F 2303/14* (2013.01); *C02F 2303/22* (2013.01); *C02F 2307/10* (2013.01)

(58) Field of Classification Search
   CPC ............ C02F 2303/14; C02F 2201/006; C02F 1/283; B01F 5/0471; B01F 3/0865; B01F 2003/0896
   USPC ..................................... 366/182.2; 134/22.11
   See application file for complete search history.

(56) References Cited

U.S. PATENT DOCUMENTS

| | | | | |
|---|---|---|---|---|
| 5,443,739 A | * | 8/1995 | Vogel | B01D 61/08 210/257.2 |
| 6,258,858 B1 | * | 7/2001 | Nakajima | B01D 17/041 516/73 |
| 2004/0108261 A1 | * | 6/2004 | King | B01F 1/0027 210/198.1 |
| 2013/0193074 A1 | * | 8/2013 | Voigt | C02F 1/048 210/638 |
| 2014/0260370 A1 | * | 9/2014 | Carew | F28F 25/00 62/91 |
| 2016/0194225 A1 | * | 7/2016 | Lask | B01D 69/04 204/538 |

FOREIGN PATENT DOCUMENTS

| | | |
|---|---|---|
| KR | 20-0197709 | 9/2000 |
| KR | 10-2013-0016551 | 2/2013 |
| KR | 10-2013-0080111 | 7/2013 |
| KR | 20130080111 A * | 7/2013 |

OTHER PUBLICATIONS

Chinese Office Action dated Feb. 9, 2018 issued in Application No. 201510919817.3 (with English Translation).

* cited by examiner

METHOD OF CLEANING A DRINKING WATER SUPPLY DEVICE

CROSS-REFERENCE TO RELATED APPLICATION

This application claims the benefit of Korean Patent Application No. 10-2014-0178358, filed on Dec. 11, 2014, which is incorporated herein by reference as if fully set forth herein.

BACKGROUND

1. Field

A drinking water supply device capable of providing mineral water and a method of cleaning a pipe in which minerals and mineral water flow of a drinking water supply device are disclosed herein.

2. Background

In general, a drinking water supply device may be a device that supplies drinking water to a user. The drinking water supply device may be a stand-alone device or may constitute part of an electric home appliance, such as, e.g., a refrigerator.

A drinking water supply device may supply drinking water at room temperature. The drinking water supply device may cool drinking water using a cold water supply unit that includes a refrigeration cycle or may heat drinking water using a heater. That is, the drinking water supply device may supply cold water or hot water to a user as needed.

Drinking water may be underground water, raw water supplied from a faucet, or filtered water obtained by filtering raw water. Drinking water may be defined as drinkable water.

Drinking water supply devices may be capable of providing water other than filtered water, cold water, or hot water. For example, the drinking water supply device may include a mineral water supply module that may be capable of providing mineral water that may contain a predetermined amount of minerals to a user.

Minerals may constitute one of the five types of nutritional substances along with protein, fat, carbohydrates, and vitamins. Minerals may play an important part in biochemical activity such as, e.g., catalytic activity, in the human body and in the constitution of, for example, the bones and teeth.

Mineral elements such as calcium (Ca), potassium (K), magnesium (Mg), and sodium (Na) may be important for metabolism. Mineral water that may contain these minerals may play a supporting role in improving health, for example, discharging waste matter from the human body and promoting digestion.

When a predetermined amount of minerals are in drinking water, the water may taste better than when the user drinks the water.

To make mineral water, an electro-analyzer, a mineral filter, or a mineral water supply module, for example, that directly supplies mineral liquid to filtered water may be applied to the drinking water supply device.

The mineral water supply module may be more compact than other types of mineral water supply modules. For example, the mineral water supply module for directly supplying condensed minerals to filtered water may be configured to have a structure in which minerals discharged from a mineral cartridge or container configured to store condensed mineral liquid may be supplied to a water discharge pipe through a mineral supply pipe.

As the amount of minerals required to generate or make mineral water is much smaller than the amount of filtered water, the mineral supply pipe may have a micro channel configured to supply a very small amount of minerals.

When energy is applied to minerals that exhibit high hardness, the minerals may crystallize and scale. The scale deposits may reduce the flow sectional area of the pipe. As a result, the flow of minerals may be obstructed, and a valve may malfunction. As the micro channel may have a reduced inner diameter such that a very small amount of minerals may flow through, the micro channel may become easily clogged due to the scale deposits.

Thus, there may be a high demand for a structure and method that may be capable of efficiently cleaning pipes in which mineral water flows and micro channels through which minerals may be supplied.

In the mineral water supply modules that supply minerals using a mineral cartridge, it may be necessary to periodically replace the mineral cartridge. If minerals remain in the mineral cartridge or in a mineral cartridge receiver in which the mineral cartridge is received, the minerals may overflow the mineral cartridge and may contaminate structures around the mineral cartridge receiver unless the residual minerals are discharged in advance.

A cleaning method that may be capable of cleaning the mineral water supply module when replacing the mineral cartridge may also improve sanitation.

BRIEF DESCRIPTION OF THE DRAWINGS

The embodiments will be described in detail with reference to the following drawings in which like reference numerals refer to like elements wherein.

DETAILED DESCRIPTION

In the following description, water that has yet to pass through a filter may be defined as raw water, raw water that has passed through a filter may be defined as clean or filtered water, and filtered water containing minerals may be defined as mineral water. In addition, one end from which a fluid is introduced to a specific point may be referred to as a front end, and the other end to which the fluid is discharged from the specific point may be referred to as a front end.

Figure 1:
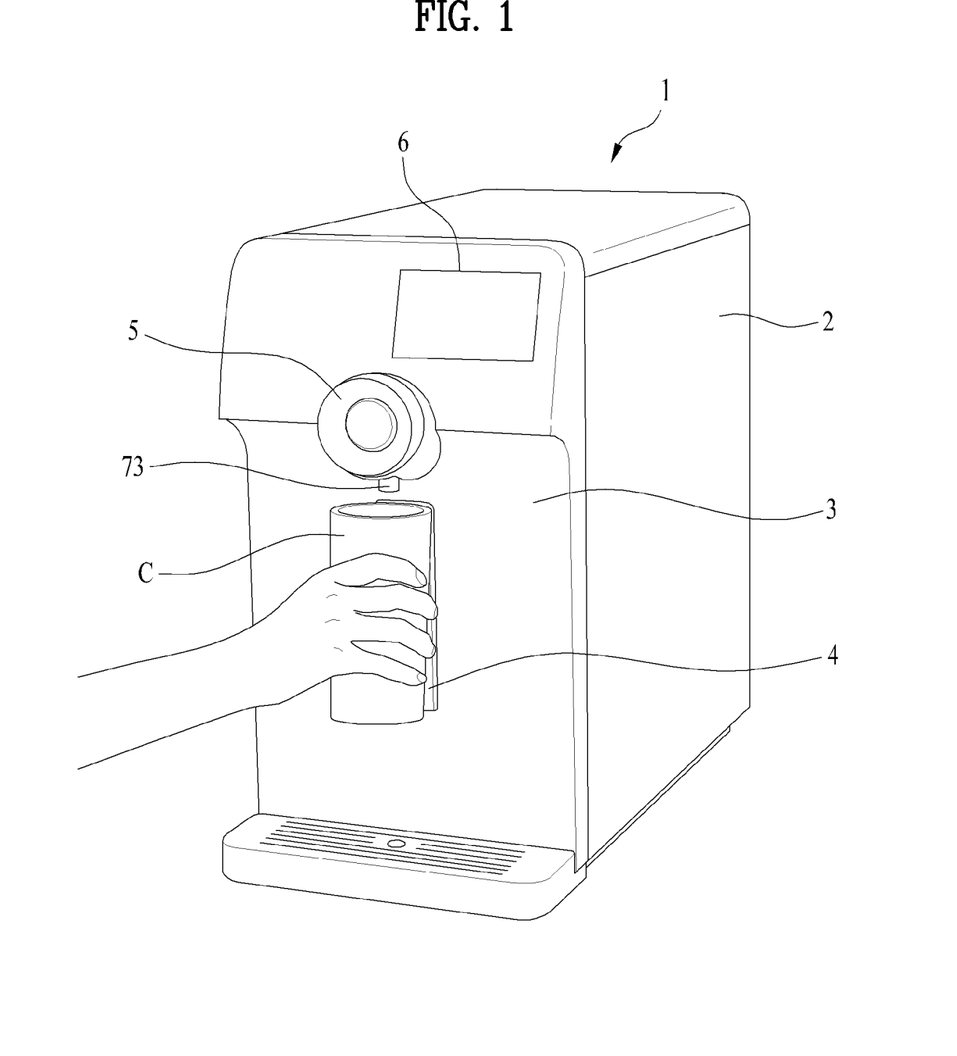
FIG. 1 is a perspective view showing an external appearance of a drinking water supply device according to an embodiment.

FIG. 1 is a perspective view showing an external appearance of a drinking water supply device according to an embodiment. The drinking water supply device 1 may include a cabinet 2 that forms the external appearance of the drinking water supply device 1 and a dispenser 3. The dispenser 3 may be a space in which drinking water may be supplied. Thus, the dispenser 3 may be formed on a front of the cabinet 2.

The dispenser 3 may be provided with a cock 73 through which drinking water may be discharged to a container or cup C. The dispenser 3 may also be provided with a lever 4 that may be manipulated to discharge drinking water. That is, a user may manipulate the lever 4 to discharge drinking water through the cock 73. The lever 4 may be pushed or pulled.

The drinking water supply device 1 may provide filtered water, cold water, or hot water as drinking water. The drinking water supply device 1 may provide other various waters as well as drinking water. Thus, the cabinet 2 may be provided with a user interface 5 configured for a user to select a type of water to be discharged.

The drinking water supply device 1 may further include a mineral water supply module for supplying mineral water. The mineral water supply module may include a mineral cartridge or container configured to store condensed minerals such that a predetermined amount of minerals from the mineral cartridge may be supplied to the filtered water.

Minerals may form scale that may clog a pipe in which minerals or mineral water may flow or may contaminate the pipe. Thus, it may be necessary to periodically clean the mineral water supply module and to show when the mineral water supply module is to be cleaned, for example, a time for cleaning.

The drinking water supply device according to the embodiment may further include a display unit or display 6 for displaying a time for cleaning the mineral water supply module. The display 6 may also inform the user when the mineral cartridge is to be replaced, for example, a time for replacing the mineral cartridge. As shown in FIG. 1, the display 6 may be provided separately from the user interface 5. Alternatively, the display 6 may be provided with the user interface 5.

Figure 2:
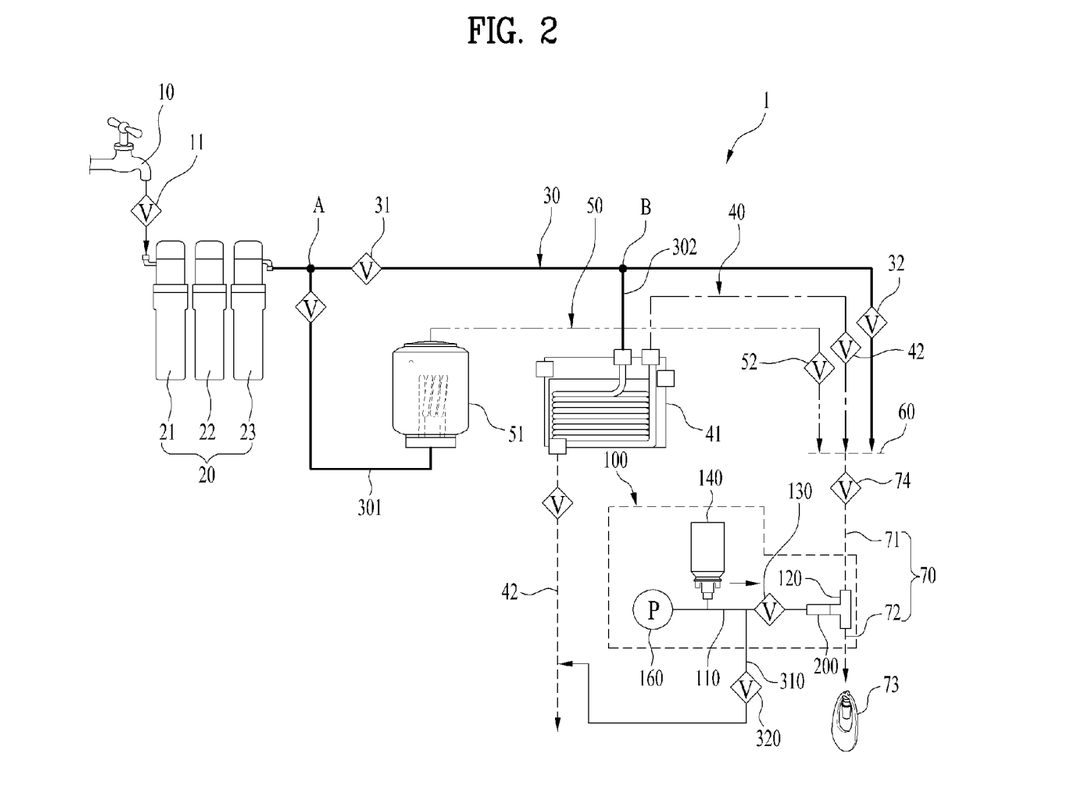
FIG. 2 is a conceptual view of a drinking water supply device according to an embodiment.

Referring to FIG. 2, the drinking water supply device 1 may convert raw water introduced into the drinking water supply device 1 through an external water tap 10 into filtered water using a filter unit 20. The construction of the filter unit 20 may vary. A plurality of single filters may constitute the filter unit 20. As shown in FIG. 2, three filters may be connected in series to one another to constitute the filter unit 20, but the embodiment is not limited thereto.

For example, the filter unit 20 may include a pre-carbon filter 21, an ultra-filtration (UF) filter 22, and a post-carbon filter 23. Other types of filters may also be added. Filtered raw water, or filtered water, may be discharged out through a filtered water pipe 30, a filtered water supply valve 32, and a cock 73.

The drinking water supply device 1 may be configured to supply cold water or hot water. Heated filtered water, or hot water, may be discharged out of the drinking water supply device 1 through a first branch filtered water pipe 301 that may diverge from point A of the filtered water pipe 30, a heating unit 51, a hot water pipe 50, a hot water supply valve 52, and a cock 73.

Cooled filtered water, or cold water, may be discharged out of the drinking water supply device 1 through a second branch filtered water pipe 302 that may diverge from point B of the filtered water pipe 30, a cooling unit 41, a cold water pipe 40, a cold water supply valve 42, and the cock 73.

An embodiment in which filtered water, cold water, and hot water may be discharged through a single cock 73 is shown in FIG. 2. Cocks for discharging the filtered water, the cold water, and the hot water may be provided separately.

The filtered water and the cold water may be discharged through one cock, and the hot water may be discharged through another cock, but embodiments are not limited thereto.

A cock valve 74 may be provided at a rear end of the filtered water supply valve 32, the cold water supply valve 42, and the hot water supply valve 52. The cock valve 74 may be connected to a distribution pipe 60. The distribution pipe 60 may be connected to the filtered water pipe 30, the cold water pipe 40, and the hot water pipe 50.

A water discharge pipe 70 through which filtered water, cold water, or hot water may be supplied may be provided at a rear end of the cock valve 74. Thus, filtered water, cold water, or hot water may be supplied into the distribution pipe 60. When the cock 73 is opened using the cock valve 74, the filtered water, the cold water, or the hot water may be selectively supplied through the water discharge pipe 70.

According to an embodiment disclosed herein, a mineral water supply module for generating mineral water may be connected to a water discharge pipe. The mineral water supply module 100 may be connected to one side of the water discharge pipe 70 via a mineral water generation unit or mineral water mixer 120, which is connected to the water discharge pipe 70.

Hereinafter, a portion of the water discharge pipe 70 located at a front end of the mineral water generation unit or mineral water mixer 120 and connected to the mineral water mixer 120 may be referred to as a water supply pipe 71, and a portion of the water discharge pipe 70 connected to a rear end of the mineral water mixer 120 may be referred to as a discharge pipe 72.

That is, the water supply pipe 71 is a pipe through which filtered water, cold water, or hot water may be selectively discharged and introduced into the mineral water mixer 120 when the cock 73 is opened by the cock valve 74.

The discharge pipe 72 is a pipe through which the filtered water, the cold water, or the hot water having passed through the mineral water mixer 120 or mineral water generated by the mineral water mixer 120 may be selectively discharged to the cock 73.

The mineral water supply module 100 may include a mineral supply pipe 110 configured to connect to the mineral water mixer 120 to supply minerals. The mineral supply pipe 110 may be provided with a mineral cartridge or container 140 configured to store condensed mineral liquid, a pump 160 configured to pressurize the mineral cartridge 140 to discharge minerals, and a mineral supply valve 130 to selectively supply minerals to the mineral water mixer 120.

The concentration of minerals supplied from the mineral water supply module 100 to the mineral water mixer 120 may be high. The mineral cartridge 140 may store condensed mineral liquid in which minerals, e.g., calcium (Ca), potassium (K), magnesium (Mg), and sodium (Na), may be mixed. For example, the concentration of minerals in the condensed mineral liquid stored in the mineral container 140 may be about 200 times the average concentration of minerals contained in filtered water.

The amount of condensed mineral liquid that may be required in order to synthesize or make mineral water with a taste users' like may be extremely little. It may be necessary to supply a predetermined fixed amount of minerals for a predetermined time in order to provide mineral water that has a taste within an allowable deviation every time.

Thus, it may be necessary to uniformly supply a predetermined very small amount of minerals for a predetermined time. The mineral water supply module 100 may have a micro channel 200 that may be capable of supplying a very small amount of minerals.

The micro channel 200 may be in a cylindrical or polyhedral shape that has a predetermined area and a predetermined length. If the pressure from the pump 160 is uniform, the amount of minerals that may be discharged from the micro channel 200 may be decided based on an area and a length of the micro channel 200.

The micro channel 200 may have a small cross-sectional area in order to supply a predetermined very small amount of minerals to the mineral water mixer 120 for a predetermined time. In addition, the micro channel 200 may have a predetermined length in order to induce pressure loss of a fluid.

For example, if the micro channel 200 is in a cylindrical shape, the diameter of the micro channel 200 may range from 0.5 mm to 1.0 mm. The maximum diameter of the micro channel 200 may be set in order to supply minerals within a predetermined range. The diameter of the micro channel 200 may be predetermined or set in order to extract filtered water or mineral water within an allowable deviation in taste when the mineral water and the filtered water are alternately discharged.

That is, when filtered water is discharged after mineral water is discharged, the diameter of the micro channel 200 may be predetermined or set in order to minimize the discharge of minerals remaining in the micro channel 200 and thus to discharge filtered water containing minerals within an allowable range of concentration.

When mineral water is discharged after filtered water is discharged, the diameter of the micro channel 200 may be predetermined or set in order to discharge mineral water containing minerals within an allowable range of concentration. The minimum diameter of the micro channel 200 may be 0.5 mm, at which it may be possible to mold or manufacture the micro channel 200. If the minimum diameter of the micro channel 200 is less than 0.5 mm, it may not be easy to mold, machine or manufacture the micro channel 200, and productivity may be lowered.

The maximum diameter of the micro channel 200 based on experiments that may satisfy the above conditions may be 1.0 mm. The diameter of the micro channel 200 may be derived based on the water supply pipe having an outer diameter of 6.35 mm and the pump having a discharge flow rate of 0.1 ml/s to 1 ml/s.

If the micro channel 200 is in a polyhedral shape, the minimum area of the micro channel 200 may be set sp that it may be possible to mold or manufacture the micro channel 200.

If the micro channel 200 has a predetermined length range, the pressure applied to minerals flowing in the micro channel 200 may be reduced to discharge a predetermined amount of minerals. In addition, it may be possible to reduce an effect caused by variation in pressure that may occur due to the operation of the pump 160.

For example, if the micro channel 200 has a length less than the lower limit of the predetermined length range, the reduction in pressure applied to the minerals flowing in the micro channel 200 may be small, and a larger amount of minerals than the predetermined amount of minerals may be discharged. That is, if the micro channel 200 is short, the pressure applied to minerals introduced from the mineral supply pipe 110 may not be sufficiently reduced due to frictional loss, and the amount of the minerals discharged may be greater than the predetermined amount of minerals to be discharged.

If the micro channel 200 is longer than the upper limit of the predetermined length range, the pressure applied to the minerals flowing in the micro channel 200 may be excessively reduced due to friction, and a smaller amount of minerals than the predetermined amount of minerals may be discharged.

In order to discharge a fixed amount of minerals within an appropriate range, therefore, the micro channel 200 may have a corresponding appropriate length. For example, the micro channel 200 may have a length ranging from 15 mm to 20 mm.

To prevent channels in which minerals or mineral water flows such as the mineral supply pipe 110, the micro channel 200, the mineral water mixer 120, and the discharge pipe 72 from being clogged and contaminated due to scale deposits, it may be necessary to periodically clean the channels.

In order to clean a channel in which minerals or mineral water flows, the mineral water supply module 100 according to an embodiment may further include a mineral discharge or drainage unit 300 connected to the mineral supply pipe 110 to discharge minerals out of the drinking water supply device 1.

The mineral drainage unit 300 may include a drainage pipe 310 connected to the mineral supply pipe 110 and a drainage valve 320 provided in the drainage pipe 310 configured to open and close the drainage pipe 310. For example, the drainage pipe 310 may be connected to a cooling water discharge pipe 42, through which cooling water may be discharged, to discharge the minerals out of the drinking water supply device 1, but the embodiment is not limited thereto. The drainage pipe 310 may be formed as an additional pipe.

Figure 3:
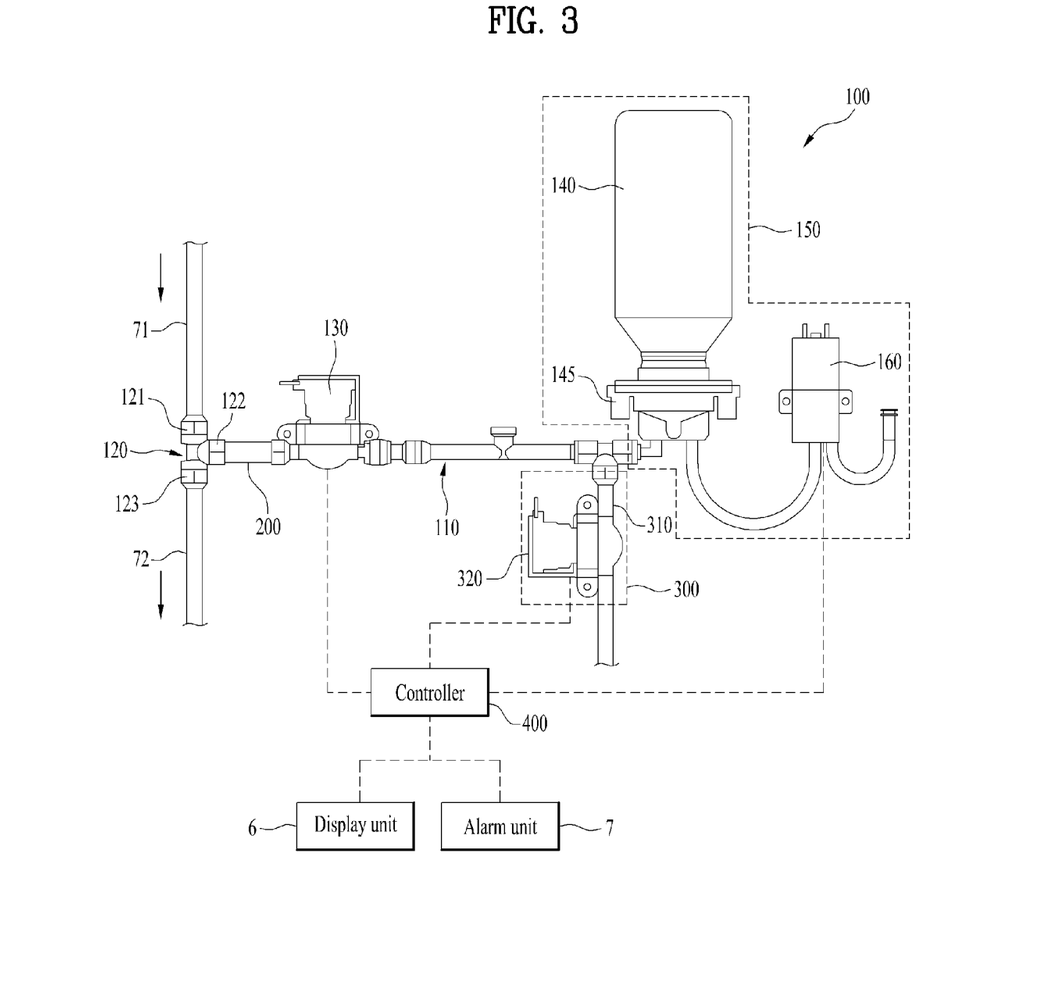
FIG. 3 is a schematic view of a mineral water supply module according to an embodiment.

Referring to FIG. 3, the mineral water supply module 100 according to an embodiment may include a water supply pipe 71 that supplies filtered water, a mineral supply pipe 110 that supplies minerals, and a discharge pipe 72 through which filtered water or mineral water may be selectively discharged based on whether or not the minerals are supplied.

A mineral supply unit 150 may be connected to the mineral supply pipe 110 to supply minerals to the mineral supply pipe 110. The mineral supply unit 150 may include a mineral cartridge 140 configured to store condensed minerals and a mineral cartridge receiver or receiving unit 145 configured to connect the mineral cartridge 140 to the mineral supply pipe 110. The mineral supply unit 150 may further include a pump 160 configured to pressurize the mineral container 140 or the mineral supply pipe 110 to discharge the minerals stored in the mineral cartridge 140 to the mineral supply pipe 110.

For example, the mineral cartridge 140 may be connected to the mineral supply pipe 110 via the mineral cartridge receiver 140. The mineral cartridge 140 may be detachably connected to the mineral cartridge receiver 145 such that the mineral cartridge 140 may be easily replaced when the minerals stored in the mineral cartridge 140 have been consumed or have not been used for a long time.

A mineral supply valve 130 may be provided in the mineral supply pipe 110 configured to selectively open and close the mineral supply pipe 110 based on whether or not mineral water is to be generated. The mineral supply valve 130 may be provided in the mineral supply pipe 110 at a rear end of the mineral cartridge 140 such that the mineral supply valve 130 may be adjacent to the water supply pipe 71.

The mineral water supply module 100 may further include a mineral water mixer 120 in which filtered water supplied from the water supply pipe 71 and minerals supplied from the mineral supply pipe 110 may be mixed to generate or make mineral water.

A first connection pipe 121 that may be connected to the water supply pipe 71, a second connection pipe 122 that may be connected to the mineral supply pipe 110, and a third connection pipe 123 that may be connected to the discharge pipe 72, may be formed at the mineral water mixer 120.

A micro channel 200 that may defice a mineral supply line through which a micro amount of minerals may be supplied may be provided in the second connection pipe 122 in order to provide mineral water in which the variation in concentration of minerals may be minimized. The micro channel 200 may define a channel in which a micro amount of minerals uniformly flow for a predetermined time in order to minimize the variation in amount of minerals discharged.

As the mineral cartridge 140 may store a predetermined amount of highly condensed minerals, the mineral cartridge 140 may need to be replaced periodically.

Figure 4:
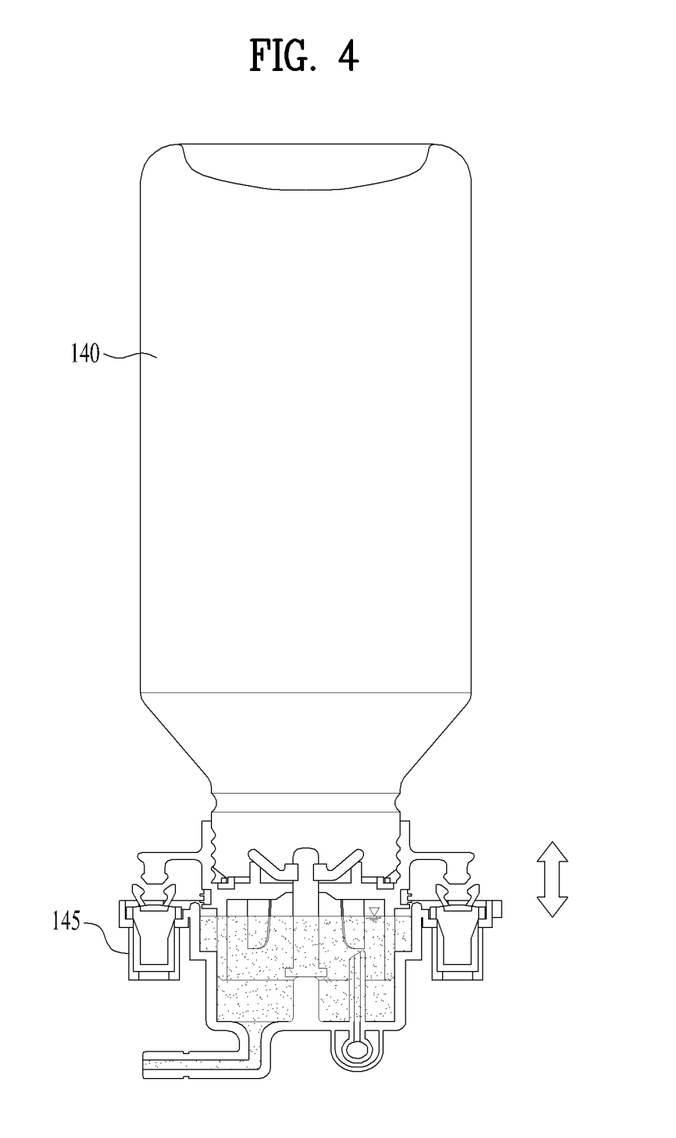
FIG. 4 is a conceptual view of minerals remaining in a mineral cartridge receiver when a mineral cartridge according to an embodiment is separated from the mineral cartridge receiver.

As shown in FIG. 4, the mineral cartridge 140 may be separated from the mineral cartridge receiver 145 in order to replace the mineral cartridge 140 or clean the channel. When the mineral cartridge 140 is being separated, a predetermined amount of minerals may remain in the mineral cartridge 140 or the mineral cartridge receiver 145. The residual minerals may overflow the mineral cartridge receiver and may contaminate pipes or structures in the drinking water supply device.

Thus, it may be necessary to discharge minerals in at least one of the mineral cartridge 140, the mineral cartridge receiver 145, or the mineral supply pipe 110 before the mineral cartridge 140 is separated from the mineral cartridge receiver 145.

For example, the mineral supply pipe 110 may be pressurized by the pump 160 such that the minerals may be discharged to the discharge pipe 72 through the micro channel 200. In this example, however, it may be necessary for the pump 160 to pressurize the mineral supply pipe 110. In addition, because the micro channel 200 may have a very small flow sectional area, it may take a long time to discharge the minerals.

Thus, the drinking water supply device 1 according to an embodiment disclosed herein may include a mineral drainage unit 300 configured to discharge the minerals remaining in at least one of the mineral cartridge 140, the mineral cartridge receiver 145, and the mineral supply pipe 110. The mineral drainage unit 300 may include a drainage pipe 310 that connects to the mineral supply pipe 110 and a drainage valve 320 provided in the drainage pipe 310 configured to open and close the drainage pipe 310.

That is, in the drinking water supply device 1, the drainage pipe 310 may diverge from the mineral supply pipe 110 in order to rapidly discharge the minerals remaining in the mineral cartridge 140, the mineral cartridge receiver 145, and the mineral supply pipe 110. The drainage pipe 310 may have the same diameter as the mineral supply pipe 110. As the mineral drainage unit 300 may rapidly discharge the residual minerals, it may be possible to reduce the cleaning time of the mineral water supply module 100.

According to an embodiment disclosed herein, the drinking water supply device 1 may further include a controller 400 configured to control the mineral supply valve 130, the drainage valve 320, and the pump 160 in order to clean the channel in which the minerals or mineral water flow.

The controller 400 may inform or show a user of a time to clean the mineral water supply module 100 or a time to replace the mineral cartridge 140 through the display 6 or an alarm unit or alarm 7.

Figure 5A:
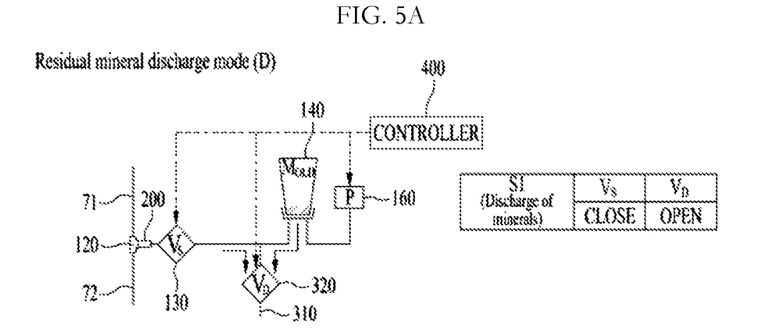
FIG. 5A to FIG. 5D are schematic views of a method of cleaning a drinking water supply device based on modes according to an embodiment.
Figure 5B:
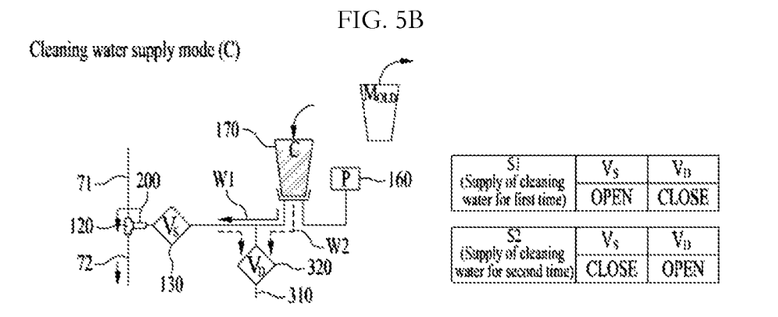
Figure 5C:
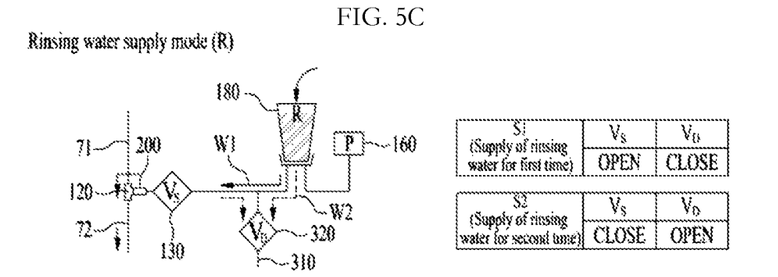
Figure 5D:
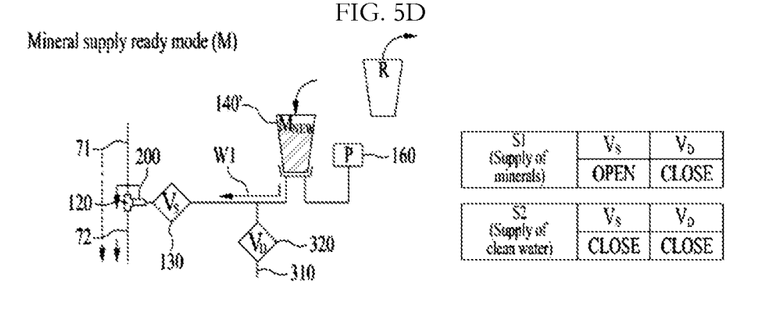
Figure 6:
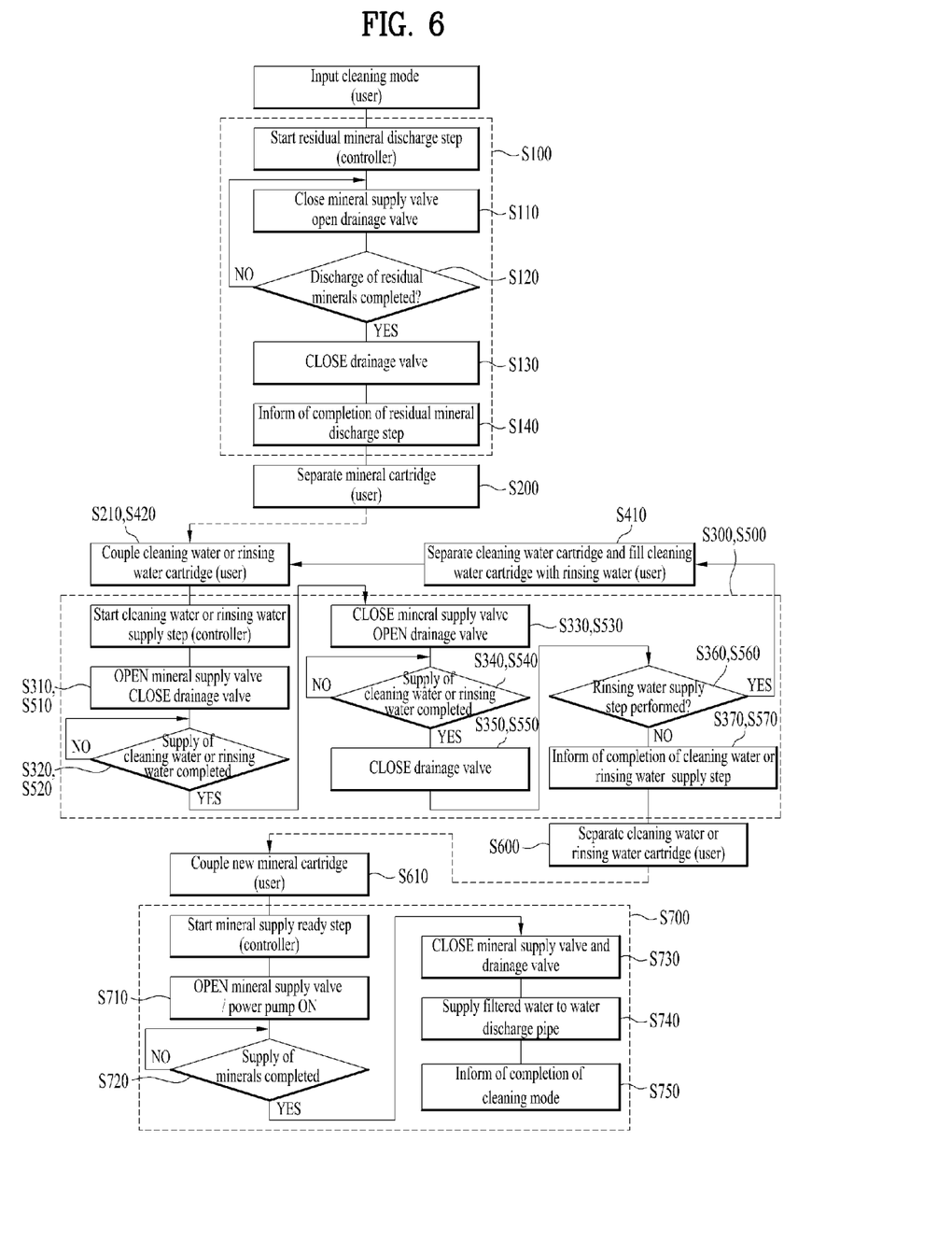
FIG. 6 is a flowchart of a method of cleaning a drinking water supply device according to an embodiment.

FIGS. 5 and 6 are views of cleaning modes of a drinking water supply device 1 for cleaning the mineral water supply module and a method of cleaning the mineral water supply module according to embodiments disclosed herein.

Upon receiving a cleaning or replacement signal, the drinking water supply device may clean the channel in which minerals or mineral water flow of the mineral water supply module based on a predetermined cleaning mode. A user who inputs the cleaning or replacement signal may include a service engineer who periodically visits a location at which the drinking water supply device may be installed to manage the drinking water supply device, but the embodiment is not limited thereto.

As shown in FIG. 5A to FIG. 5D, the cleaning modes of the drinking water supply device 1 for cleaning the channel in which minerals or mineral water flow may include a residual mineral discharge mode D, a cleaning water supply mode C to supply cleaning water, and a rinsing water supply mode R to supply rinsing water.

When the residual mineral discharge mode D is selected or input by the user, the controller 400 may close the mineral supply valve 130 and open the drainage valve 320 to discharge minerals through the drainage pipe 310.

In the residual mineral discharge mode D, minerals remaining in the mineral supply pipe 110, the mineral cartridge 140, and the mineral cartridge receiver 145 may be discharged out of the drinking water supply device 1 through the drainage pipe 310. In the residual mineral discharge mode D, the pump 160 may be operated in order to easily discharge the minerals stored in the mineral cartridge 140.

The controller 400 may control the drainage valve 320 to be open for a predetermined time. As a predetermined amount of minerals may be initially stored in the mineral cartridge 140, a replacement time for the mineral cartridge 140 may be decided based on a number of times minerals may be supplied. That is, the amount of minerals remaining in the mineral cartridge 140 after the minerals are discharged a predetermined number of times may be derived by calculation or experimentation.

Thus, the controller 400 may open the drainage valve 320 for a predetermined time according to the flow rate discharged based on the calculated or set residual quantity of minerals.

According to an embodiment disclosed herein, the drinking water supply device 1 may further include a flow rate sensor provided in the drainage pipe 310. In this case, the controller 400 may open the drainage valve 320 until a flow rate measured by the flow rate sensor is lower than a predetermined flow rate and may then close the drainage valve 320.

When the residual mineral discharge mode D is completed, the cleaning water supply mode C may be executed. The cleaning water supply mode C may be a mode to supply cleaning water to the channel in which minerals or mineral water flow in order to remove scale deposits or contaminants.

The channel may include a first channel W1 defined by the mineral supply pipe 110 and the micro channel 200, in which minerals flow, and the mineral water mixer 120 and the discharge pipe 72, in which mineral water flows. The channel may include a second channel W2 defined by the drainage pipe 310 through which minerals may be discharged.

An additional cleaning water cartridge 170 configured to store cleaning water may be provided to execute the cleaning water supply mode C. The cleaning water cartridge 170 may be attached or coupled to the mineral cartridge receiver 145 to supply cleaning water to the first channel W1 and the second channel W2.

That is, when the residual mineral discharge mode D is completed, the user may separate the mineral cartridge 140, where the residual minerals may have been completely discharged, from the mineral cartridge receiver 145 and may then attach or couple the cleaning water cartridge 170 to the mineral cartridge receiver 145.

Thus, the cleaning water supply mode C may be selected or input by the user after the cleaning water cartridge 170 is attached or coupled to the mineral cartridge receiver 145. Alternatively, the controller 400 may sense whether the cleaning water cartridge 170 has been attached or coupled to the mineral cartridge receiver 145 in order to automatically execute the cleaning water supply mode C.

It may be difficult to remove scale deposits formed in the channel using just water. Thus, the cleaning water cartridge 170 may store electrolytic water or a chemical cleaning liquid. Alternatively, the cleaning water cartridge 170 may store water exhibiting a sterilization effect in order to remove contaminants remaining in the channel.

When the cleaning water supply mode C is selected or input, the controller 400 may open the mineral supply valve 130 and may close the drainage valve 320 for a predetermined first time in order to clean the first channel W1.

After the predetermined first time, the controller 400 may close the mineral supply valve 130 and may open the drainage valve 320 for a predetermined second time in order to clean the second channel W2. During the cleaning water supply mode C, the pump 160 may be operated continuously or may be operated only for the predetermined first time.

When the cleaning water supply mode C is completed, the controller 400 may confirm whether or not the rinsing water supply mode R is to be executed.

The rinsing water supply mode R may be executed automatically after the completion of the cleaning water supply mode C, or the cleaning water supply mode C and the rinsing water supply mode R may be executed according to user's selection.

The rinsing water supply mode R may be executed in order to remove the cleaning water remaining in the mineral water supply module 100 and to rinse the mineral water supply module 100. If the cleaning liquid used in the cleaning water supply mode C is a liquid that does not require rinsing of the mineral water supply module 100, then the rinsing water supply mode R may not need to be executed.

When the user selects to not execute the rinsing water supply mode R, the controller 400 may inform or show the user that the cleaning water supply mode C has been completed. Thus, the controller 400 may confirm whether or not the rinsing water supply mode R is to be executed.

When the rinsing water supply mode R is selected, the controller 400 may inform or show the user that it may be time to replace the cleaning water cartridge 170 or may wait for a predetermined time to replace the cleaning water cartridge 170.

The user may be able to separate the cleaning water cartridge 170 from the mineral cartridge receiver 145. In addition, the user may fill the cleaning water cartridge 170 with rinsing water and may attach or couple the cleaning water cartridge with the rinsing water, or a rinsing water cartridge 180, to the mineral cartridge receiver 145. The rinsing water may be water supplied from a faucet or water containing additional ingredients.

When the rinsing water cartridge 180 is attached or coupled to the mineral cartridge receiver 145, the rinsing water supply mode R may be executed. The rinsing water supply mode R may be executed according to user's selection or input after the rinsing water cartridge 180 is attached or coupled to the mineral cartridge receiver 145. Alternatively, the controller 400 may sense whether the rinsing water cartridge 180 has been attached or coupled to the mineral cartridge receiver 145 in order to automatically execute the rinsing water supply mode R.

When the rinsing water supply mode R is input, the controller 400 may open the mineral supply valve 130 and may close the drainage valve 320 for a predetermined first time in order to supply rinsing water to the first channel W1.

After the first time, the controller 400 may close the mineral supply valve 130 and may open the drainage valve 320 for a predetermined second time in order to supply rinsing water to the first channel W1. During execution of the rinsing water supply mode R, the pump 160 may be operated continuously or may be operated only for the predetermined first time. After the predetermined second time passes, the drainage valve 320 may be closed, and the cleaning mode of the mineral water supply module 100 may be completed.

The controller 400 may inform or show the user that the residual mineral discharge mode D, the cleaning water supply mode C, and the rinsing water supply mode R are completed through the display 6 or the alarm 7.

After the mineral water supply module 100 has been cleaned, a mineral supply ready mode M may be executed to get the mineral water supply module ready to supply minerals to the first channel W1.

After the rinsing water supply mode R is completed, the user may separate the rinsing water cartridge 180 from the mineral cartridge receiver 145 and may attach or couple a new mineral cartridge 140' to the mineral cartridge receiver 145.

After the new mineral cartridge 140' is attached or coupled to the mineral cartridge receiver 145, rinsing water may remain in the mineral supply pipe 110 or the mineral cartridge receiver 145. If the rinsing water remains in the mineral supply pipe 110 or the mineral cartridge receiver 145, the rinsing water may be discharged together with the mineral water when mineral water is first discharged after the new mineral cartridge 140' is coupled to the mineral cartridge receiver 145 such that the mineral water may taste differently.

The controller 400, then, may open the mineral supply valve 130, and may operate the pump 160 for a predetermined time in the mineral supply ready mode M. That is, minerals may be supplied to the first channel W1 in order to discharge the rinsing water remaining in the first channel W1.

Thus, it may be possible to prevent mineral water first discharged after the new mineral cartridge 140' is coupled to the mineral cartridge receiver 145 from deviating from an allowable deviation range in concentration of minerals in the mineral water.

The mineral supply ready mode M may include a water discharge pipe cleaning mode for the controller 400 to close the mineral supply valve 130 and to supply filtered water to the water supply pipe 71 for a predetermined time after the completion of the supply of minerals.

The water discharge pipe cleaning mode may be executed to remove minerals remaining in the discharge pipe 72 by discharging minerals to discharge the rinsing water through the discharge pipe 72. That is, the minerals remaining in the discharge pipe 72 may be discharged such that, when filtered water is subsequently discharged, the filtered water discharged may not be mixed with the minerals.

Thus, it may be possible to prevent filtered water first discharged after the new mineral cartridge 140' is coupled to the mineral cartridge receiver 145 from deviating from an allowable deviation range in concentration of minerals in the filtered water.

When the mineral supply ready mode M is completed, the controller 400 may inform or show the user that it may be possible to supply mineral water through the display 6 or the alarm 7.

FIG. 6 is a flowchart of executing the cleaning modes of the drinking water supply device according an embodiment disclosed herein. A method of cleaning a drinking water supply device 1 including a mineral water supply module 100 may include a residual mineral discharge step (S100), a cleaning water supply step (S300), and a rinsing water supply step (S500).

The steps of the method of cleaning the drinking water supply device 1 may be carried out sequentially after the cleaning mode of the drinking water supply device 1 is selected. When the cleaning mode is selected or input by the user, the residual mineral discharge step (S100) may be carried out first by the controller 400.

At the residual mineral discharge step (S100), the mineral supply valve 130 may be closed and the drainage valve 320 may be opened for a predetermined time (S110). Minerals remaining in the mineral supply pipe 110, the mineral cartridge 140, and the mineral cartridge receiver 145 may then be discharged through the drainage pipe 310 (S120). When the step (S120) of discharging the residual minerals is completed, a step (S130) of closing the drainage valve 320 may be carried out.

The residual mineral discharge step (S100) may further include a step (S140) of informing or showing the user that the discharge of minerals has been completed after the discharge of the residual minerals has been completed.

When the residual mineral discharge step (S100) is completed, a step (S200) of separating the mineral cartridge 140 from the mineral cartridge receiver 145 may be carried out. Subsequently, a step (S210) of attaching or coupling a cleaning water cartridge 170 that stores cleaning water to the mineral cartridge receiver 145 may be carried out.

When the user selects the cleaning water supply step (S300) after the cleaning water cartridge 170 is coupled to the mineral cartridge receiver 145, the cleaning water supply step (S300) may be carried out by the controller 400.

In the cleaning water supply step (S300), cleaning water may be supplied to the first channel W1 and the second channel W2, sequentially. The cleaning water supply step (S300) may include a step (S310) of opening the mineral supply valve 130 and closing the drainage valve 320 via the controller 400. The cleaning water supply step (S300) may further include a first cleaning water supply step (S320) to supply cleaning water to the first channel W1 for a predetermined first time.

After the predetermined first time, a step (S330) of closing the mineral supply valve 130 and opening the drainage valve 320 for a predetermined second time may be carried out. The cleaning water supply step (S300) may further include a second cleaning water supply step (S340) to supply cleaning water to the second channel W2.

When the second cleaning water supply step (S340) is completed, the drainage valve 320 may then be closed (S350). After the drainage valve 320 is closed (S350), a step of confirming (S360) whether the rinsing water supply step (S500) is to be carried out may be carried out. Alternatively, the rinsing water supply step (S500) may be carried out automatically after the completion of the cleaning water supply step (S300).

Whether and how many times the rinsing water supply step (S500) is to be carried out may be selected by the user, or the rinsing water supply step (S500) may be carried out according to a predetermined condition. As shown in FIG. 6, whether and how many times the rinsing water supply step (S500) is to be carried out may be selected by the user, but the embodiment is not limited thereto.

When the rinsing water supply step (S500) is selected, the cleaning water cartridge 170 from which the cleaning water has been supplied may be separated from the mineral cartridge receiver 145 by the user (S410). After the user fills the cleaning water cartridge 170 with rinsing water (S410), a step of attaching or coupling a rinsing water cartridge 180 to the mineral cartridge receiver 145 (S420) may be carried out.

Alternatively, an additional rinsing water cartridge may be attached coupled to the mineral cartridge receiver 145. In this case, the step of filling the cleaning water cartridge 170 with rinsing water (S410) may be omitted.

If the rinsing water supply step (S500) is not selected by the user after the completion of the cleaning water supply step (S300), a step (S370) of informing or showing the user that the cleaning water supply step (S300) has been completed may be carried out. That is, if cleaning water that does not require additional rinsing is supplied, the rinsing water supply step (S500) may not need to be carried out.

In the rinsing water supply step (S500), rinsing water may be supplied to the first channel W1 and the second channel W2 sequentially for a predetermined time. The rinsing water supply step (S500) may include a step (S510) of opening the mineral supply valve 130 and closing the drainage valve 320 by the controller 400. The rinsing water supply step (S500) may further include a first rinsing water supply step (S520) of supplying rinsing water to the first channel W1 for a predetermined first time.

After the predetermined first time, a step (S530) of closing the mineral supply valve 130 and opening the drainage valve 320 for a predetermined second time may be carried out. The rinsing water supply step (S500) may further include a second rinsing water supply step (S540) of supplying rinsing water to the second channel W2.

When the second rinsing water supply step (S540) is completed, the drainage valve 320 may be closed (S550). A step of confirming (S560) whether the rinsing water supply step (S500) is to be further carried out may then be carried out. That is, the rinsing water may be repeatedly supplied. If the rinsing water supply step (S500) is not further selected, a step of informing the user (S570) that the rinsing water supply step (S500) has been completed may be carried out.

When the rinsing water supply step (S500) is completed, a mineral supply ready step (S700) of attaching or coupling a new mineral cartridge 140' to the mineral cartridge receiver 145 to supply minerals may be carried out.

The mineral supply ready step (S700) may be carried out to prevent filtered water or mineral water that is first selected by the user after the replacement of the mineral cartridge from tasting differently.

For example, when the rinsing water supply step (S500) is completed, the user may separate the rinsing water cartridge 180 from the mineral cartridge receiver 145 (S600). Subsequently, a new mineral cartridge coupling step (S610)

of attaching or coupling the new mineral cartridge 140' to the mineral cartridge receiver 145 may be carried out.

After the new mineral cartridge coupling step (S610), the mineral supply valve 130 may be opened, and the drain valve 320 may be closed (S710). Subsequently, a mineral supply step (S720) of supplying minerals from the new mineral cartridge 140' to the first channel W1 for a predetermined time to discharge rinsing water remaining in the first channel W1 may be carried out.

The mineral supply step (S720) may be carried out to remove rinsing water remaining in the mineral supply pipe in order to prevent the change in concentration of mineral water that is first discharged after the new mineral cartridge 140' is attached or coupled to the mineral cartridge receiver 145.

When the mineral supply step (S720) is completed, the mineral supply valve 130 may be closed, and the drainage valve 320 remains closed (S730).

The mineral supply ready step (S700) may further include a water discharge pipe cleaning step (S740) of supplying filtered water to the water discharge pipe 70 in order to discharge minerals remaining in the discharge pipe 72 after supplying the minerals to the first channel W1 for the predetermined time.

When the water discharge pipe cleaning step (S740) is carried out, the water discharge pipe 70 may be cleaned with filtered water so that it may be possible to prevent minerals from being in the filtered water that may be first discharged after the new mineral cartridge 140' may be attached or coupled to the mineral cartridge receiver 145.

According to embodiments disclosed herein, a method of cleaning a drinking water supply device may be provided where residual minerals may be rapidly discharged from a mineral water supply module, thereby reducing cleaning time.

A mineral cartridge may be provided that is capable of being separated from a mineral cartridge receiver. A cleaning water cartridge or a rinsing water cartridge may be coupled to the mineral cartridge receiver, thus achieving easy and efficient cleaning.

Furthermore, filtered water or mineral water first discharged after the new mineral cartridge is coupled to the mineral cartridge receiver may not taste differently, thus providing filtered water or mineral water within an allowable deviation in taste of water.

According to embodiments disclosed herein, a structure and method of cleaning a drinking water supply device capable of efficiently cleaning a channel in which mineral water flows and a micro channel in which minerals flow may be provided.

A method of cleaning a drinking water supply device according to an embodiment to discharge minerals stored in a mineral cartridge for a predetermined time or more by cleaning a mineral water supply module at the time of replacing the mineral cartridge, and thus improving safety and sanitation, may be provided.

A method of cleaning a drinking water supply device to prevent contamination of structures around a mineral cartridge receiver caused when minerals overflow a mineral cartridge and the mineral cartridge receiver at the time of replacing the mineral cartridge may be provided.

A method of cleaning a drinking water supply device to rapidly discharge the residual minerals, and thus reducing cleaning time, may be provided.

A method of cleaning a drinking water supply device to more effectively remove scale deposits using cleaning water configured to remove the scale may be provided.

A method of cleaning a drinking water supply device to easily clean the drinking water supply device by removing a mineral cartridge from a mineral cartridge receiver and coupling a cartridge containing cleaning water or rinsing water to the mineral cartridge receiver may be provided.

A method of cleaning a drinking water supply device to effectively remove cleaning water or rinsing water remaining in a mineral supply pipe after a new mineral cartridge is installed may be provided.

According to embodiments disclosed herein, a method of cleaning a drinking water supply device capable of effectively cleaning a mineral water supply module that supplies mineral water may be provided.

According to an embodiment disclosed herein, a drinking water supply device to provide filtered water or mineral water to a user may include a water supply pipe configured to channel water and a mineral supply pipe provided with a mineral supply valve configured to be opened and closed to selectively supply minerals to the water supply pipe and a micro channel configured to supply minerals.

The drinking water supply device may further include a mineral supply unit including a mineral cartridge configured to store condensed minerals, a mineral cartridge receiver configured to detachably couple to the mineral cartridge and to connect to the mineral supply pipe, and a pump to discharge the minerals stored in the mineral cartridge.

The drinking water supply device may further include a mineral water mixer configured to connect to the mineral supply pipe and the water supply pipe and configured to allow mixing of the minerals from the mineral supply pipe with the water in the water supply pipe, and a discharge pipe configured to connect to the mineral water mixer and the water supply pipe to discharge filtered water or mineral water.

The drinking water supply device may further include a mineral drainage unit including a drainage pipe configured to connect to the mineral supply pipe to discharge minerals and a drainage valve provided in the drainage pipe configured to open and close the drainage pipe in order to clean the mineral supply unit.

The drinking water supply device may further include a controller configured to control the mineral supply valve, the drainage valve, and the pump to clean a channel in which minerals or mineral water flow.

In the drinking water supply device according to an embodiment, the mineral supply unit may be efficiently cleaned via a residual mineral discharge mode, a cleaning water supply mode to supply cleaning water, and a rinsing water supply mode to supply rinsing water.

When the residual mineral discharge mode is selected, the controller may close the mineral supply valve and may open the drainage valve. That is, residual minerals may be discharged first to prevent contamination of structures around the mineral cartridge receiver due to overflow of the minerals that may occur when the mineral cartridge is separated from the mineral cartridge receiver.

In addition, minerals may be discharged through the drainage pipe instead of the micro channel in which a very small amount of minerals flow, and thus rapidly discharge minerals remaining in the mineral supply unit.

The controller may open the drainage valve for a predetermined time or may decide an opening time of the drainage valve based on a flow rate value measured by a flow rate sensor provided in the drainage pipe.

The cleaning water supply mode may be a mode for cleaning the channel in which the minerals or the mineral water flow using additional cleaning water.

In order to execute the cleaning water supply mode, an additional cleaning water cartridge may be coupled to the mineral cartridge receiver instead of the mineral cartridge. When the discharge of the cleaning water is completed, the cleaning water cartridge may be filled with rinsing water such that the cleaning water cartridge is reused to execute the rinsing water supply mode.

That is, the cleaning water cartridge may be detachably coupled to the mineral cartridge receiver to which the mineral cartridge may be coupled, and thus easily supply cleaning water or rinsing water.

When the cleaning water supply mode or the rinsing water supply mode is selected, the controller may open the mineral supply valve for a predetermined first time and may close the drainage valve for a predetermined time in order to clean the mineral supply pipe, the micro channel, the mineral water generation unit, and the discharge pipe.

After the first time, the controller may close the mineral supply valve and may open the drainage valve for a predetermined second time in order to clean the drainage pipe.

That is, the mineral supply pipe, the micro channel, the mineral water generation unit, and the discharge pipe, in which the minerals or the mineral water flow, may be cleaned first for a predetermined time, and then the drainage pipe may be cleaned using the remaining cleaning water.

After the cleaning water supply mode is completed, the rinsing water supply mode may be executed to discharge cleaning water remaining in the mineral water supply module and to rinse the pipe through which the cleaning water has flowed.

In the rinsing water supply mode, the cleaning water cartridge may be filled with rinsing water after the cleaning water supply mode, and then the mineral supply pipe, the micro channel, the mineral water generation unit, and the discharge pipe may be cleaned for the first time.

After the first time, the controller may close the mineral supply valve and open the drainage valve for the second time in order to clean the drainage pipe.

When the rinsing water supply mode is completed, a new mineral cartridge may be coupled to the mineral cartridge receiver.

A mineral supply ready mode may be executed such that minerals may be discharged from the new mineral cartridge to supply mineral water. In the mineral supply ready mode, the controller may operate the pump and open the mineral supply valve for a predetermined time to supply minerals to the mineral supply pipe.

It may be possible to supply minerals from the new mineral cartridge to the mineral supply pipe by controlling the valve and to discharge rinsing water remaining in the mineral supply valve. Thus, it may be possible to prevent mineral water first discharged after the new mineral cartridge is coupled to the mineral cartridge receiver from deviating from an allowable deviation range in concentration of minerals in the mineral water.

The mineral supply ready mode may include a water discharge pipe cleaning mode to close the mineral supply valve and supply filtered water to the water supply pipe for a predetermined time under control of the controller.

The water discharge pipe cleaning mode may be executed to remove minerals remaining in the discharge pipe by supplying the minerals to discharge rinsing water through the discharge pipe in order to prepare a first cup of mineral water. Thus, it may be possible to prevent filtered water first discharged after the new mineral cartridge is coupled to the mineral cartridge receiver from deviating from an allowable deviation range in concentration of minerals in the filtered water.

According to embodiments disclosed herein, a method of cleaning a drinking water supply device for supplying filtered water or mineral water may be provided which includes a mineral water supply module comprising a mineral cartridge to store condensed minerals, a mineral supply pipe provided with a micro channel to supply minerals to a water supply pipe, a mineral cartridge receiver detachably coupled to the mineral cartridge and connected to the mineral supply pipe, a mineral supply valve to open and close the mineral supply pipe, and a discharge pipe to discharge filtered water or mineral water.

The method of cleaning the drinking water supply device may include discharging residual minerals using a mineral drainage unit including a drainage pipe connected to the mineral supply pipe and a drainage valve for opening and closing the drainage pipe (a residual mineral discharge step), supplying cleaning water to a channel in which minerals or mineral water flow of the mineral water supply module (a cleaning water supply step), and supplying rinsing water to the channel in which the minerals or the mineral water flow (a rinsing water supply step).

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of cleaning a drinking water supply device comprising a mineral water supply module comprising a mineral cartridge to store condensed minerals, a mineral supply pipe to supply minerals to a water supply pipe, a mineral cartridge receiver detachably coupled to the mineral cartridge and connected to the mineral supply pipe, a mineral supply valve to open and close the mineral supply pipe, a discharge pipe to discharge filtered water or mineral water, and a filter unit provided upstream of the discharge pipe, the method comprising:

discharging residual minerals using a mineral drainage unit including a drainage pipe connected to the mineral supply pipe and a drainage valve to open and close the drainage pipe;

separating the mineral cartridge from the mineral cartridge receiver and coupling a cleaning water cartridge that contains cleaning water to the mineral cartridge receiver;

supplying cleaning water to a channel that includes the mineral supply pipe and the discharge pipe in which minerals or mineral water flow; and supplying rinsing water to the channel in which the minerals or the mineral water flow.

2. The method according to claim 1, wherein the discharging residual minerals includes closing the mineral supply valve and opening the drainage valve for a predetermined time to discharge minerals remaining in at least one of the mineral supply pipe, the mineral cartridge, and the mineral cartridge receiver through the drainage pipe.

3. The method according to claim 2, wherein the discharging residual minerals further includes informing a user after completion of the discharge of the residual minerals that the discharge of the residual minerals has been completed.

4. The method according to claim 1, wherein the channel in which the minerals or the mineral water flow includes:

a first channel provided by the mineral supply pipe, a mineral water generation unit configured to connect to the mineral supply pipe; the water supply pipe, and the discharge pipe and configured to allow mixing of the minerals from the mineral supply pipe with the water in the water supply pipe, and a second channel provided by the drainage pipe.

5. The method according to claim 4, wherein the supplying cleaning water includes:

opening the mineral supply valve and closing the drainage valve for a predetermined first time to supply the cleaning water to the first channel; and closing the mineral supply valve and opening the drainage valve for a predetermined second time after the predetermined first time to supply the cleaning water to the second channel.

6. The method according to claim 5, wherein the supplying rinsing water includes:

filling the cleaning water cartridge with rinsing water;

coupling the cleaning water cartridge to the mineral cartridge receiver; and supplying the rinsing water sequentially to the first channel and the second channel after the supplying cleaning water.

7. The method according to claim 6, further comprising:

separating the cleaning water cartridge from the mineral cartridge receiver and coupling a new mineral cartridge to the mineral cartridge receiver after the supplying rinsing water is completed.

8. The method according to claim 7, further comprising opening the mineral supply valve and closing the drainage valve to supply minerals from the new mineral cartridge to the first channel for a predetermined time after the coupling the new mineral cartridge.

9. The method according to claim 8, wherein the supplying minerals from the new mineral cartridge includes supplying filtered water to the water discharge pipe to discharge minerals remaining in the discharge pipe after supplying the minerals to the first channel.

* * * * *